United States Patent [19]

Geiger

[11] 4,244,223

[45] * Jan. 13, 1981

[54] SYSTEM AND METHOD FOR GEOPHYSICAL PROSPECTING BY MEASUREMENT OF EARTH TIDES

[76] Inventor: Allen R. Geiger, 2600 E. Idaho #227, Las Cruces, N. Mex. 88001

[*] Notice: The portion of the term of this patent subsequent to Oct. 24, 1995, has been disclaimed.

[21] Appl. No.: 56,242

[22] Filed: Jul. 10, 1979

Related U.S. Application Data

[63] Continuation-in-part of Ser. No. 843,500, Oct. 19, 1977, Pat. No. 4,121,464.

[51] Int. Cl.³ .............................................. G01V 9/00
[52] U.S. Cl. ............................. 73/382 G; 73/170 R
[58] Field of Search .......................... 73/382 R, 382 G

[56] References Cited

U.S. PATENT DOCUMENTS 4,121,464  10/1978  Geiger ..................................... 73/382

FOREIGN PATENT DOCUMENTS 1314888  12/1962  France ....................................... 73/382

OTHER PUBLICATIONS

"Travaux de L'Association de Geodesie"-Report By W. D. Lambert, Sep. 1936, 28 pages, pp. 1-3.
"Transactions of American Geophysical Union"-Jun. 1956, vol. 37, No. 3, pp. 266-272, An Improved Instrument for Measurement of Tidal Variations in Gravity by Clarkson et al.

*Primary Examiner*—James J. Gill
*Attorney, Agent, or Firm*—Allen D. Brufsky

[57] ABSTRACT

To locate potentially hydrocarbon-bearing subsurface formations, tiltmeters measure the time of arrival and the apparent direction of a lunar/solar induced earth tide at an array of points on the earth's surface. The measurements are combined to determine the shape of the tidal wave in a region of interest. The shape is indicative of subsurface viscosity in the region. Subsurface formations having an abnormally low viscosity are considered potentially hydrocarbon bearing.

15 Claims, 28 Drawing Figures

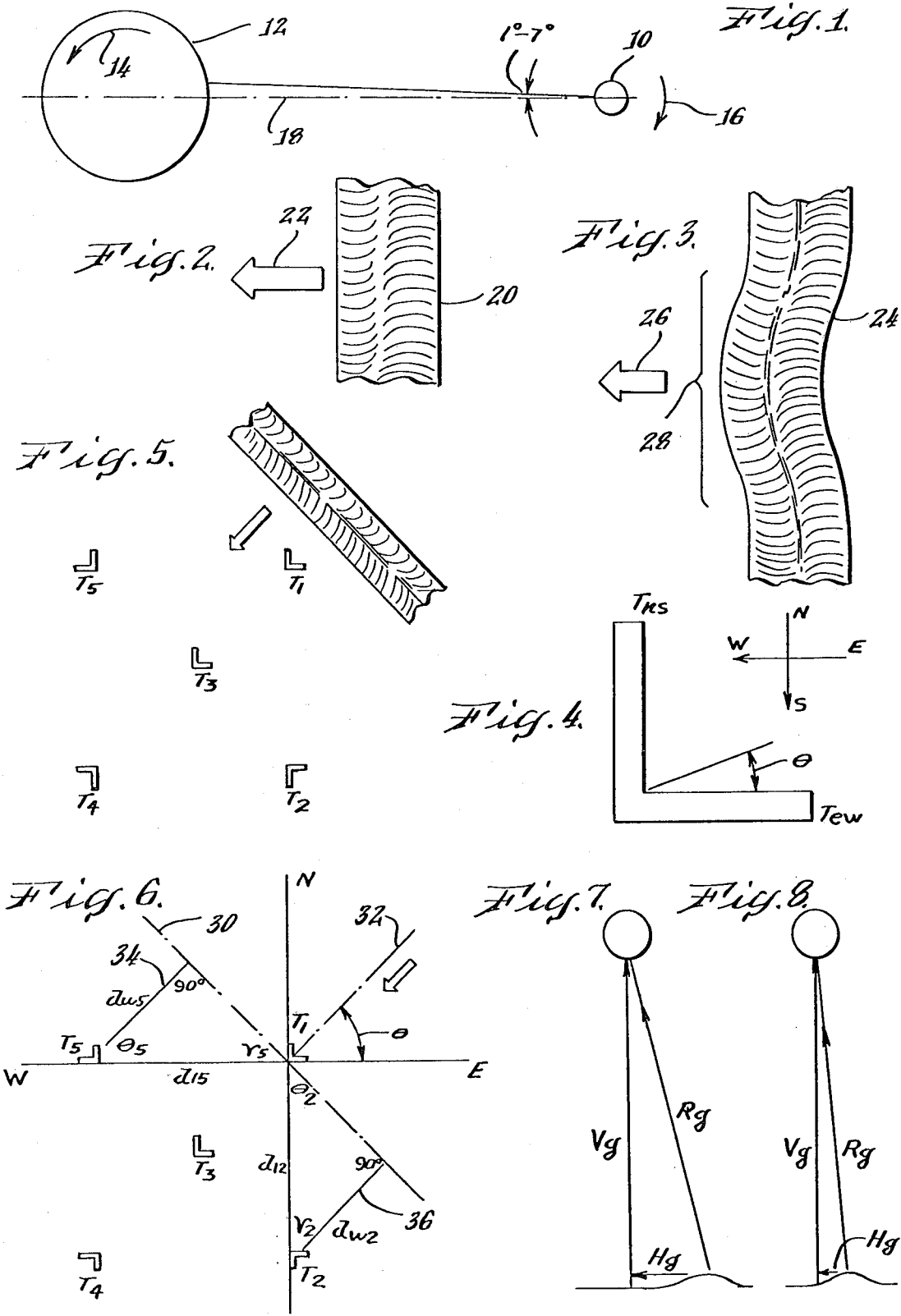

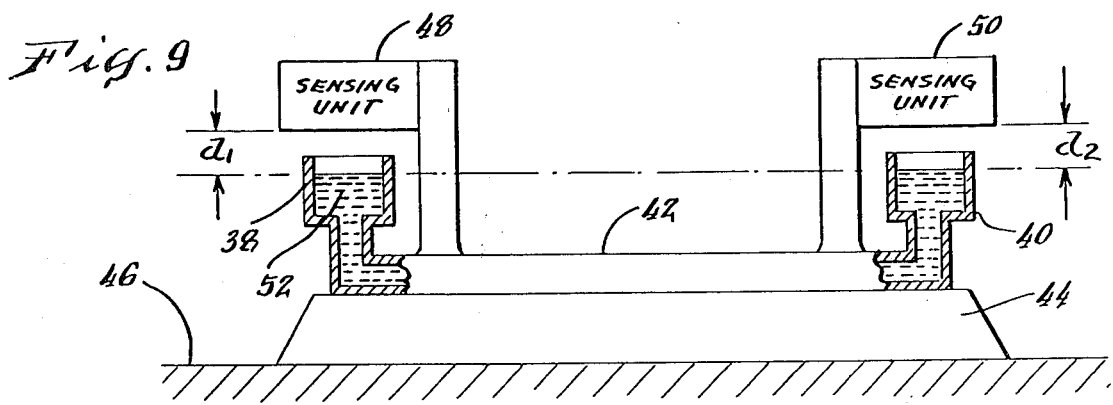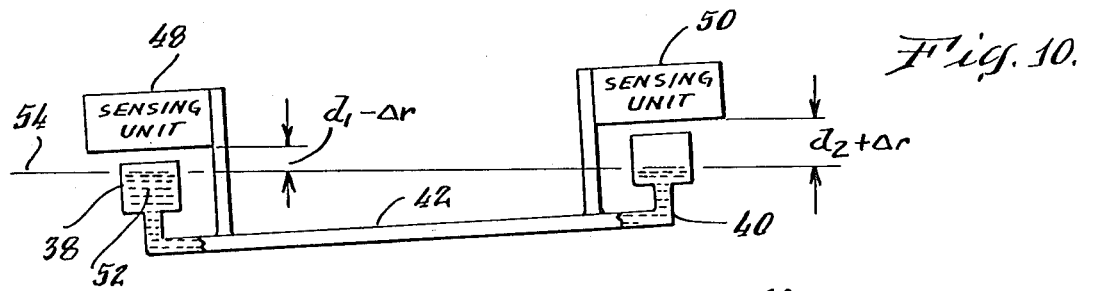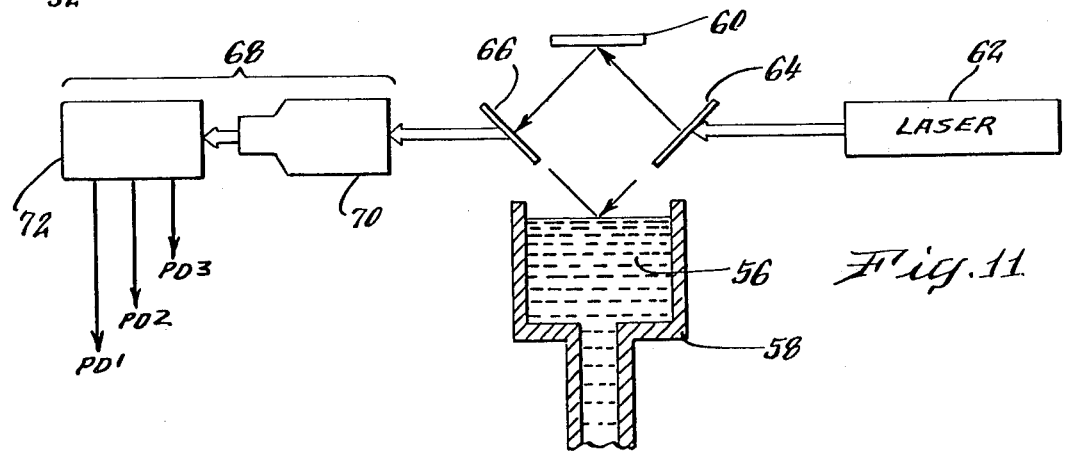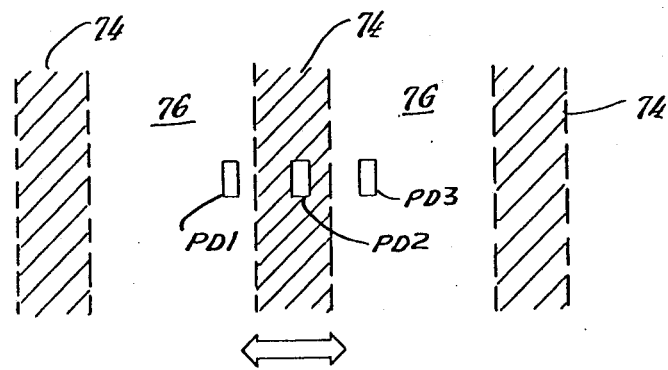

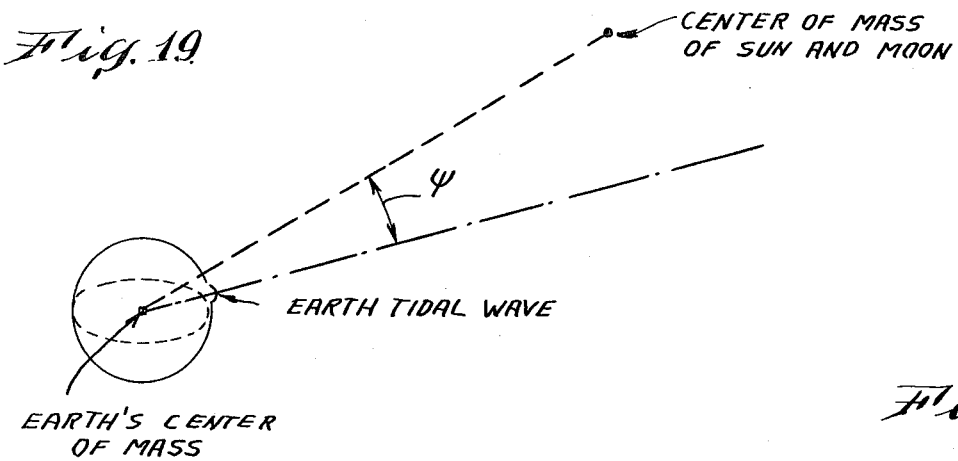
Fig. 19
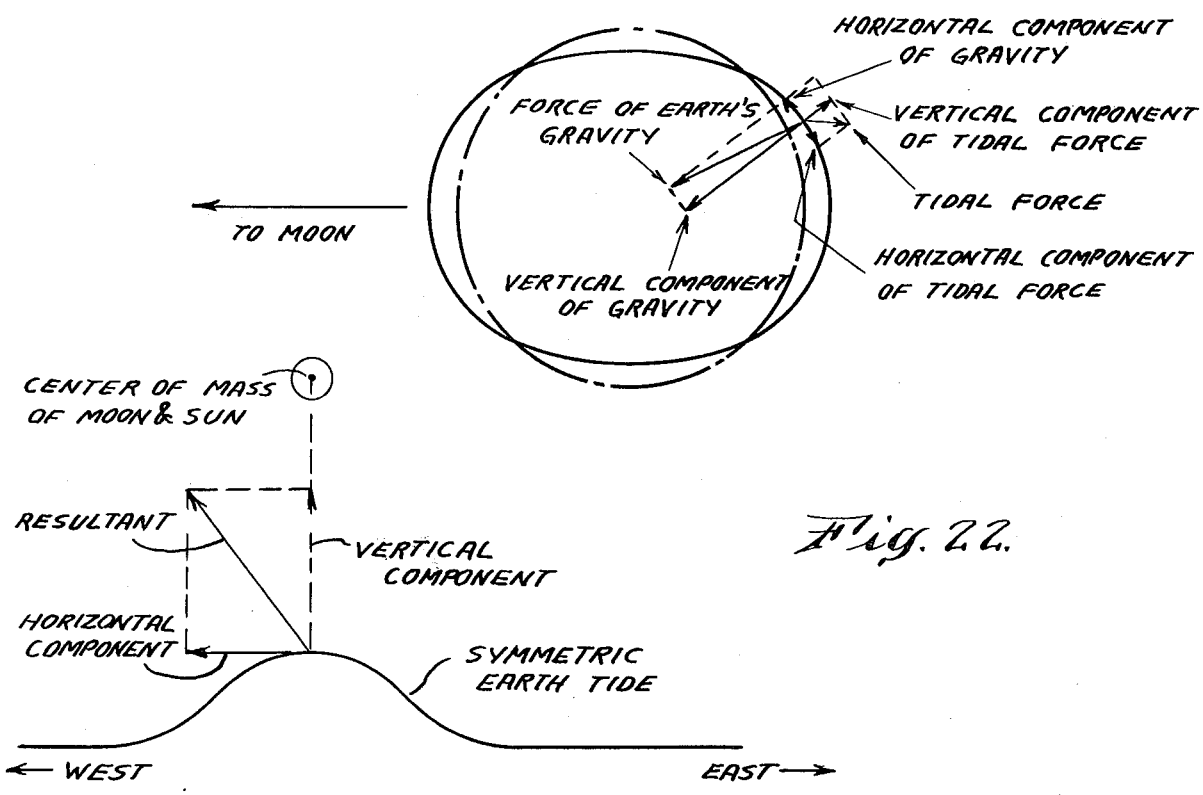
Fig. 20
Fig. 22
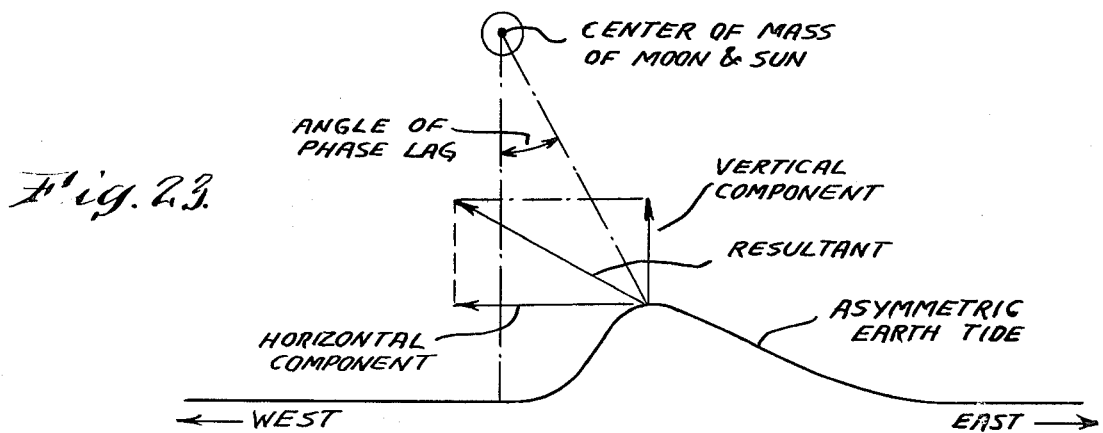
Fig. 23

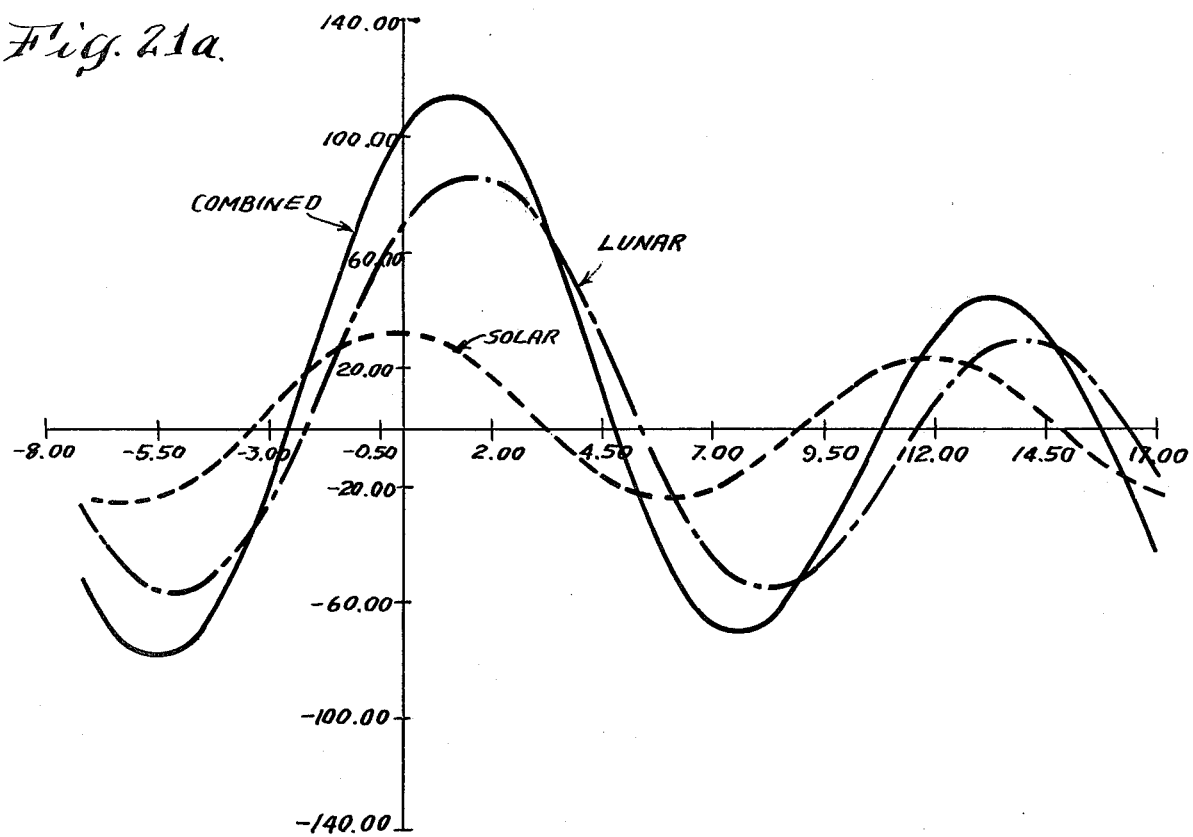
Fig. 21a. THEORETICAL GRAVITATIONAL EARTH TIDES — VERTICAL COMPONENT
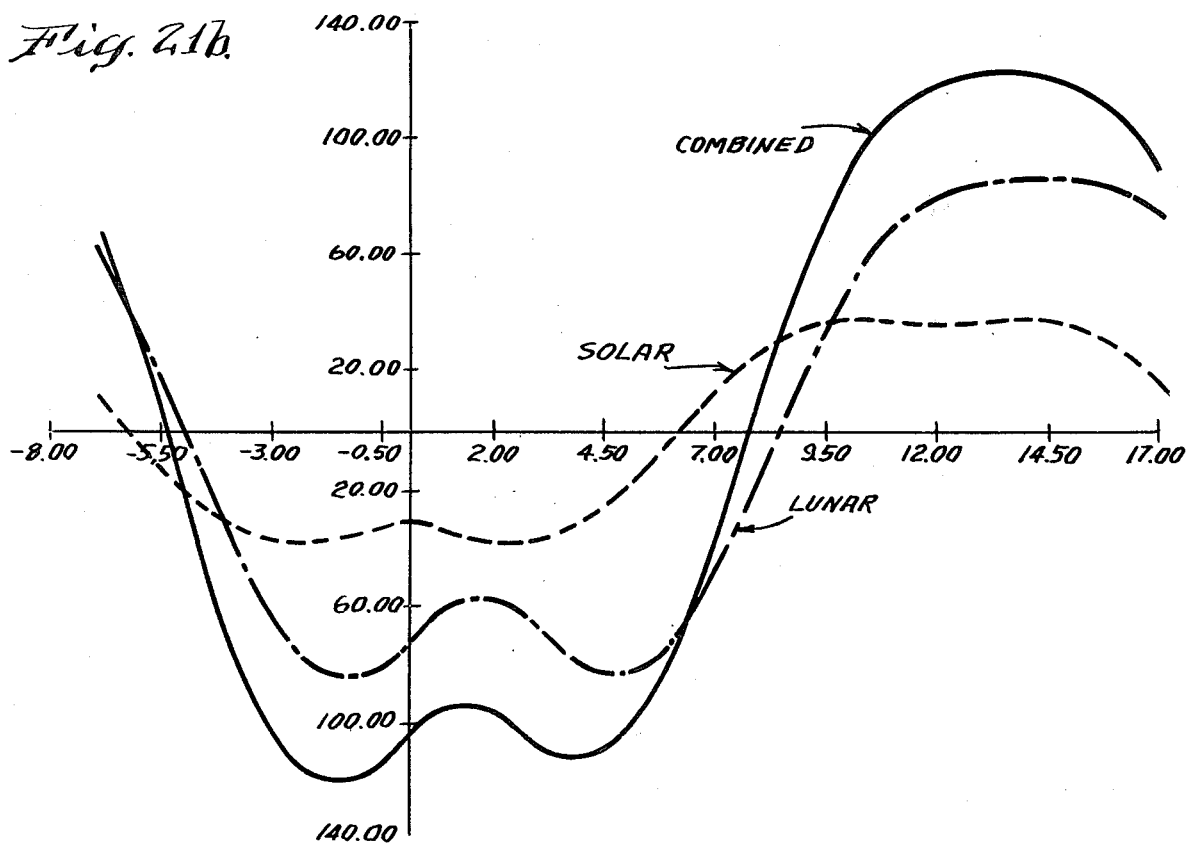
Fig. 21b. THEORETICAL GRAVITATIONAL EARTH TIDES — HORIZONTAL COMPONENT

4,244,223

SYSTEM AND METHOD FOR GEOPHYSICAL PROSPECTING BY MEASUREMENT OF EARTH TIDES

BACKGROUND OF THE INVENTION

This is a continuation-in-part of application Ser. No. 843,500, filed Oct. 19, 1977, now U.S. Pat. No. 4,121,464.

The present invention relates to geophysical prospecting and more particularly to a system and method for geophysical prospecting through measurement of earth tides.

For a number of years, people have had available an abundant supply of relatively inexpensive fossil energy in the form of oil and natural gas. However, the known sources or proven reserves of such fossil energy have not kept pace with the increasing demand, leading to critical short term shortages and less critical but still serious long term shortages.

While alternative sources of energy, such as nuclear energy or solar energy, are being explored it is not widely believed that such alternative sources will be available soon enough to avoid a severe international energy crisis.

The most feasible short term solution for the fossil fuel shortage is to find additional reserves of the fossil fuels. Various seismic techniques are used in efforts to locate certain kinds of subsurface formations using surface measurements. The nuclear, acoustic and electrical properties of such formations can all be studied through the use of measurements made at surface detectors.

The reason for making such measurements is to determine the most advantageous location for drilling an oil or gas well. Since the costs of drilling a well can be quite high, the geologist or other individual responsible for deciding whether to begin drilling needs to have as much information as possible about the subsurface formations in a region of interest before drilling to minimize the chances of a dry or nonproducing well.

SUMMARY OF THE INVENTION

The present invention complements known methods of geophysical prospecting and provides additional information about subsurface formations in any region of interest.

The present invention is a system and method for geophysical prospecting in which the rise and fall of the earth's surface due to the gravitational pull of the moon and sun is detected. The time of arrival and apparent direction of this earth tidal wave is measured at a number of spaced points. The time and direction measurements are combined to establish the wave shape in the region of interest. The wave shape is indicative of the subsurface viscosity in the region. A region of abnormally low viscosity is a potential hydrocarbon-bearing region.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 1 is a simplified view of the earth and the moon showing the retardation of the earth tide;

FIG. 2 illustrates a section of earth tide in a region of uniform viscosity;

FIG. 3 illustrates a section of earth tide in a region of abnormal viscosity;

FIG. 4 is a schematic representation of a biaxial tiltmeter used to determine a time of arrival and apparent direction of movement of an earth tide at a single point;

FIG. 5 illustrates an array of tiltmeters used to track the movement of an earth tide through a region of interest;

FIG. 6 is a diagram of trigonometric relationships used in analyzing an earth tide traversing an array of tiltmeters;

FIG. 7 is a vector diagram showing gravitational force vectors in a high viscosity region;

FIG. 8 is a vector diagram showing gravitational force vectors in a low viscosity region;

FIG. 9 is a view of part of a tiltmeter in a level position;

FIG. 10 is a view of the same part when tilted by a traversing earth tide;

FIG. 11 is a schematic diagram of an interferometric tiltmeter suitable for measuring the magnitude of an earth tide at a particular point on the earth's surface;

FIG. 12 illustrates the relationship between a preferred photodetector array in an optical head for a tiltmeter and interferometric bands generated by the interferometer of FIG. 11;

FIG. 19 is a simplified diagram of the earth and the center of mass of the moon and the sun;

FIG. 20 is a diagram showing the various forces acting upon the earth;

FIGS. 21a, 21b, 21c, 21d, 21e and 21f are graphical plots of the various components of the tides over a period of time;

FIG. 22 is a cross-sectional view of a portion of the earth's crust taken in an east-west direction showing a symmetrically shaped geoid tide in phase with the center of mass of the moon and sun; and FIG. 23 is a view similar to FIG. 22, but showing an asymmetrically shaped geoid tide which is out of phase with the center of mass of the moon and the sun.

DETAILED DESCRIPTION OF THE INVENTION

Figure 13:
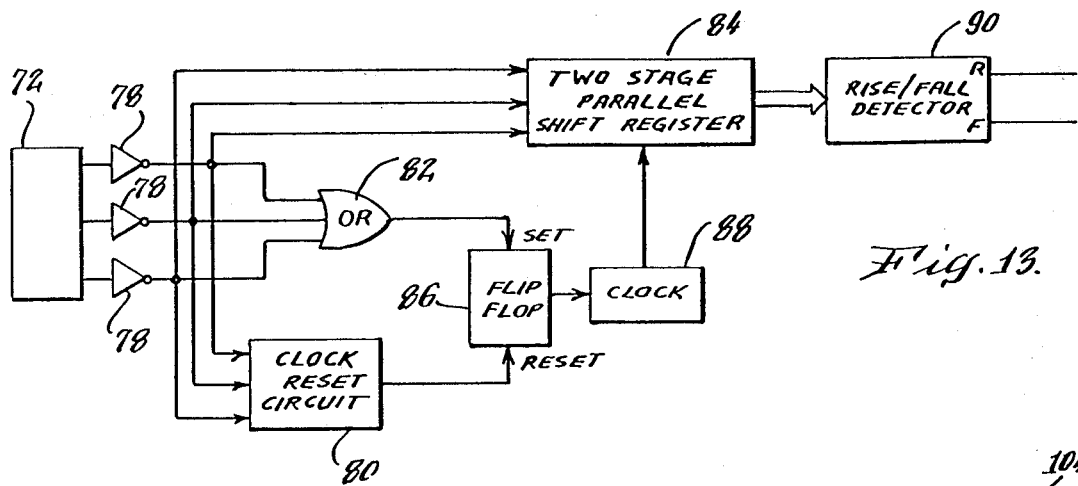
FIG. 13 is a block diagram of one portion of a circuit for measuring the magnitude of the earth tide at a point on the surface.

The present invention is broadly concerned with determining the shape of tidal waves in the earth's crust which are induced by the gravitational effects of particular extraterrestrial bodies. For sake of simplicity, the concepts of the invention will first be described based on the assumption that the earth is influenced solely by the gravitational effects of the earth's moon. Subsequently, discussion of the combined gravitational effects of the moon and sun along with other influencing factors will be provided.

Referring now first to FIG. 1, the effects of the gravitational pull of the moon 10 on the oceans of earth 12 have been noted and studied for many centuries. As the earth 12 turns on its axis in the counterclockwise direction indicated by arrow 14, (resulting in relative movement of the moon 10 in the direction indicated by arrow 16) the gravitational attraction of the moon generally causes ocean high tides at the particular point on the earth's surface which is on the center line 18 between the center of the earth's mass and the center of the moon's mass.

It is not widely recognized that the gravitational pull of the moon also causes the earth's crustal surface to rise and fall in a single advancing wave, referred to hereafter as an earth tide. Unlike high ocean tide, high earth tide does not occur at the center line 18. Because of the resistance or drag of the earth's crustal rocks, the maximum earth rise lags behind the center line 18 from 1° to 7° with approximately 5° retardation being normal.

The characteristics of the advancing earth tide are influenced by changes in the density and viscosity of the medium through which it propagates; namely the earth's crustal surface. For example, in regions of lower-than-normal viscosity, the wave velocity will increase while in regions of higher-than-normal viscosity, the velocity will decrease.

Referring to FIG. 2, an earth tide 20 traversing a region of uniform viscosity in the direction indicated by arrow 22 will be seen to have relatively straight leading edge and uniform magnitude. In contrast, FIG. 3 depicts a wave 24 propagating in a direction indicated by arrow 26 in a region of lower-than-normal viscosity. The section 28 of the wave above the low viscosity region is bowed outwardly in the direction of propagation and has a greater-than-normal magnitude. Conversely, an earth tide traversing an area of higher-than-normal viscosity will tend to have a bow in a direction opposite the direction of propagation and will have a reduced magnitude.

Subsurface formations containing water or hydrocarbons, such as oil and/or natural gas will exhibit lower viscosity than "dry" formations. By measuring the earth's tide at a number of points on the earth's surface, the shape of the earth tidal wave in a region of interest can be established. Forwardly bowed sections of the earth wave will indicate potentially hydrocarbon-bearing, low viscosity subsurface formations.

To establish the wave shape, the time of arrival and apparent direction of the wave at each of a plurality of points is measured using a device known as biaxial tiltmeters. A preferred embodiment of such a device is described in detail later. Basically, a biaxial tiltmeter is a device for measuring the rise and fall of the earth's surface along two orthogonal axes as the earth tide traverses a region of interest. Referring to FIG. 4, a biaxial tiltmeter would include a first arm T1 for measuring the rise and fall of the earth due to the wave component traveling in a first direction, arbitrarily designated as east to west and a second arm for measuring the rise and fall of the earth's surface due to the wave component in a second direction, arbitrarily designated as north to south. Each tiltmeter arm is responsive to the rise and fall of the earth only along a single axis. For example, if an earth tide is traveling due west, arm T1 will (on a scale of 0 to 10) have a reading of 10. Conversely, if an earth tide is moving due south, arm T2 will have a reading of 10 while arm T1 will have a reading of 0.

An earth tide approaching the biaxial tiltmeter from some direction other than along one of the axes will cause both T1 and T2 to measure some rise in the earth's surface.

If an earth rise is detected at both T1 and T2, the angle of the approaching earth tide relative to one of the axes, designated as due east, can be calculated as a tangent of T2/T1. For example, if T1 has a reading of 7 while T2 has a reading of 3, the angle $\theta$ will be the arctangent of 7/3 or approximately 24°.

While the apparent direction of movement and the time of arrival of an earth tide can be found from a single biaxial tiltmeter, the distortion or dynamic changes in the wave shape can be established only by taking readings at a plurality of points in a region of interest. FIG. 5 illustrates a suitable array of tiltmeters T1, T2, T3, T4 and T5. To simplify computations, tiltmeters T1, T2 T4 and T5 are located at the corners of a square of known size while tiltmeter T3 is located at the center of that square. While this arrangement is preferred for computational purposes, any placement of tiltmeters could be used in which the distance and relative bearings between tiltmeters is known.

FIG. 6 illustrates the type of calculations which can be performed to establish the velocity of the wave front and to determine whether the wave front is straight or distorted.

In that Figure, it is assumed that the wave front has arrived at tiltmeter T1 and relative readings along orthogonal axes have established that an angle $\theta$ exists between due east and a normal 32 to the wave front 30. Basic geometry indicates that the angles $\theta_2$ between the wave front and due south and $\theta_5$ between due east and a normal 34 to the wave front are equal to $\theta$.

The normal 34 drawn from the wave front 30 to the tiltmeter T5 forms the third side of a right angle triangle having interior angles of $\theta_5$ and $\gamma_5$ where $\gamma_5$ equals $90° - \theta_5$. Since the distance $d_{w5}$ between tiltmeter T1 and tiltmeter T5 is known, the distance $d_{w5}$ between the wave front 30 and the tiltmeter T5 can be computed as $d_{w5} = d_{15} \sin \gamma_5$. The velocity of the wave front along the normal 34 is equal to the distance $d_{w5}$ divided by the time interval between the arrival of the wave at tiltmeter T1 and the arrival of the wave at tiltmeter T5.

Similar trigonometric relationships are employed in determining that the distance $d_{w2} = d_{12} \sin \theta_2$. If the wave is not distorting, its velocity along a normal 36 between the wave front and tiltmeter T2 will be equal to the velocity of the wave front along the normal 34 at tiltmeter T5. If the wave traverses the normals at different velocities, the wave front is being distorted by subsurface formations of abnormally high or abnormally low viscosity. Naturally, the operations of the various tiltmeters have to be synchronized on a time basis to permit velocity comparisons. Direct electrical connections between the tiltmeters with a single master clock might be used to establish the synchronization. Using ground loop currents to carry a timing signal is another possibility.

By taking readings at a number of spaced points in a region of interest, the shape of the wave front as it traverses the region can be established. By analyzing the wave shapes and the changes in those shapes, subsurface formations of abnormally high or abnormally low viscosity can be located in the region of interest.

The wave shapes in the region of interest are not static as they traverse a region of abnormal viscosity but rather change as they approach and leave the region due to the restoring force of the moon's gravitational pull. Elementary vector analysis indicates that the gravitational pull due solely to the moon would produce an earth tide having a relatively straight wave front.

Referring to FIG. 7, the gravitational vectors in a region of abnormally high viscosity are shown. The total or resultant vector $R_g$ is a function of the magnitudes of a vertical vector $V_g$ and a horizontal vector $H_g$. While vertical vector $V_g$ is relatively constant, the horizontal vector $H_g$ will be relatively high in a high viscosity region due to the large included angle between the vector $R_g$ and the vector $V_g$. The horizontal vector $H_g$ will tend to increase the velocity of the retarded portion of the wave until a normal wave shape is re-established. FIG. 8 shows the same gravitational vectors in a region of abnormally low viscosity. The horizontal vector $H_g$ is relatively small in such a region causing any advanced sections of the wave to be gradually retarded relative to the rest of the wave as the earth tide passes beyond the region of abnormally low viscosity.

Although the foregoing description of the method involved in the invention was based on the assumption that the forces producing the earth tides were those due solely to the gravitational influence of the moon, the gravitational effects of the sun as well as other factors must also, in fact, be given consideration in accurately predicting and measuring the dynamic and geometric characteristics of earth tides. It is known that the earth is well within the gravitation influence of the sun as well as the moon and that the gravitation field of the sun is roughly one-half of that of the moon's. Thus, the true gravitational potential exerted on the earth is the result of the combined effects of the sun and moon and is given by the equation:

$$W = Ga^2/2\{[M_s(3\cos^2\psi - 1)/R_s^3] + [M_m(3\cos^2\psi - 1)/R_m^3]\}$$

where "a" is the mean radius of the earth, $M_s$ is the mass of the sun, $M_m$ is the mass of the moon, and as shown in FIG. 19, $\psi$ is the angle between a line extending from the center of the earth's mass to the center of mass of the sun and moon, and a line from the center of the earth's mass through the tidal wave. Referring now to FIG. 22, if it is assumed that the tidal wave is in phase with the center of mass of the moon and sun (i.e. aligned between the center of earth's mass and that of the moon and sun), then the amplitude of the tide is affected by the vertical component $\Delta g$ of the tidal potential which is given by:

$$\Delta g = \partial w/\partial a = Ga[M_s(3\cos^2\psi - 1)/R_s^3 + M_m(3\cos^2\psi - 1)/R_m^3]$$

However, since the earth's crust presents resistance to the flow of the tidal wave, as previously suggested, it is believed that a horizontal component of force $\Delta gh$, may act on the tidal wave as well which is given by:

$$\Delta gh = 3/2 Ga[M_s \sin 2\psi/R_s^3 + M_m \sin 2\psi/R_m^3]$$

The precise effect on tidal geometry caused by the horizontal component of force is somewhat uncertain, but it is believed that this force component may aid the earth tides into returning to their original shapes, consequently, the horizontal force can be used to calculate regional viscosities of the earth's crust by measuring the response time. FIG. 21a and 21b respectively display graphical plots of the calculated values of the vertical and horizontal components of the gravitational earth tides over a period of time at a specific location on the earth's surface.

Further complicating the process of predicting the geometry and timing of earth tides is the fact that the shape of the earth distorts under the influence of tidal forces and is not quite spherical as a result of gravitational pull thereon as illustrated in FIG. 20. As shown in FIG. 20, the tidal force includes a vertical and horizontal component which are offset in part by the force of the earth's gravity. However, since the earth's gravitational pull on a tidal wave is not exactly in a direction perpendicular to the earth's surface (due to distortion of the earth), there is a slight horizontal component in addition to the vertical component of gravity acting on the tidal wave. From the foregoing, then, it may be appreciated that in making measurements of gravity acting on an object on the surface of the earth, the resultant gravity observed in the earth's gravity downward plus the solar and lunar gravity upward, and that the earth's gravity is a function of the observer's distance from the earth's center which distance is moved toward or away from the earth's center as the earth's crust deforms. However, because of the phase lag mentioned previously, deformation along with the gravity associated with deformation is not necessarily correlatable with the maximum gravitation tidal potentials given by the equations above and resolution of these two forces may be impossible.

In any event, it is necessary to take into consideration the combined effects of the vertical and horizontal earth tide components, and for purposes of the remainder of this discussion, the response of the earth's crustal surface to these earth tide components will be termed a "geoid tide". Geiod tide is calculated and measured with respect only to deformation of the earth's crustal surface. Generally, a phase lag exists between the earth tides and the geoid tides to some extent and as a result thereof, the side of the geoid tide is closest to the maximum gravitational potential point (the point closest to the moon) will experience a strong horizontal pull.

Figure 21C:
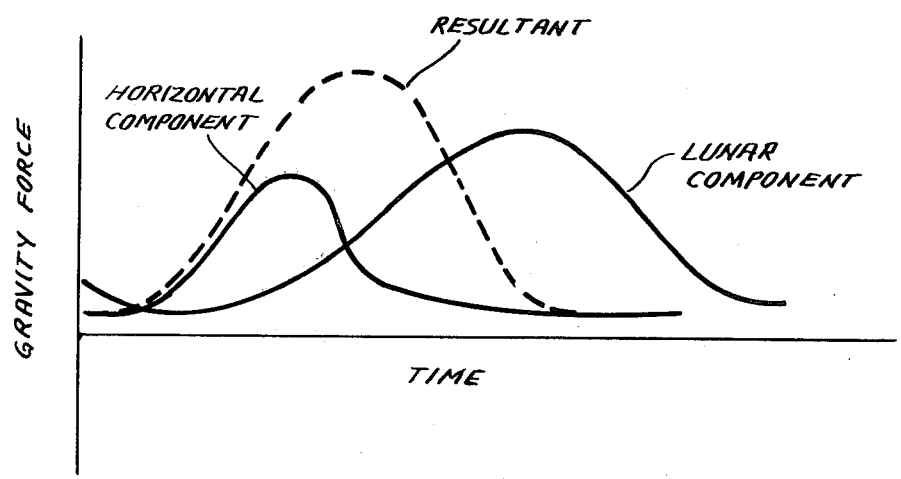
Figure 21D:
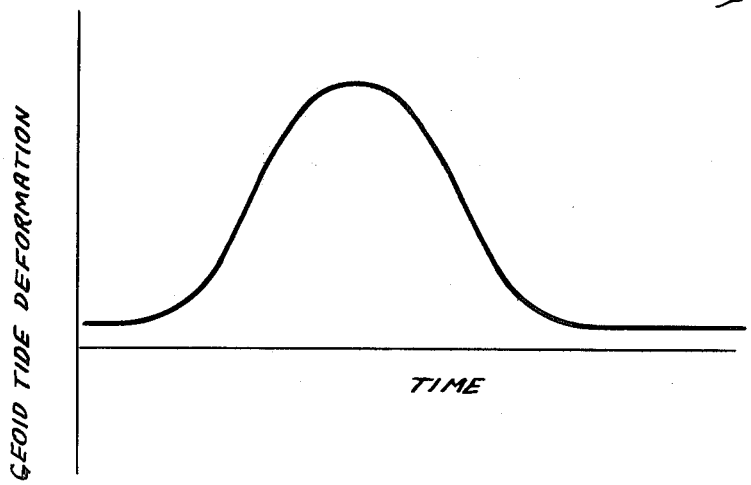

The relationship between the geoid tide and the solar and lunar gravity are depicted in FIGS. 21c and 21d. In FIG. 21c, the solar and lunar components of gravity are shown to occur at different times, due to their different positions relative to the earth, along with the "resultant" gravitational force. In FIG. 21d, the curve of the resulting deformation tide may of may not be in phase with the resultant gravitational force shown in FIG. 21c.

During same periods, the shape of the geoid tide may be asymmetrical, as indicated in FIG. 23, because of the position of the sun and moon relative to the earth and the deviation of the geoid wave from a symmetrical shape (See FIG. 22) will depend on the strength of the individual tidal force components (as possibly modified by horizontal force components). For purposes of geological prospecting, the asymmetrical nature of the geoid tidal wave must be taken into consideration. Variations in the asymmetry of the tidal wave of any particular point in time will be affected by the volumetric strain constants of the materials present in the geologic region of interest.

Figure 21E:
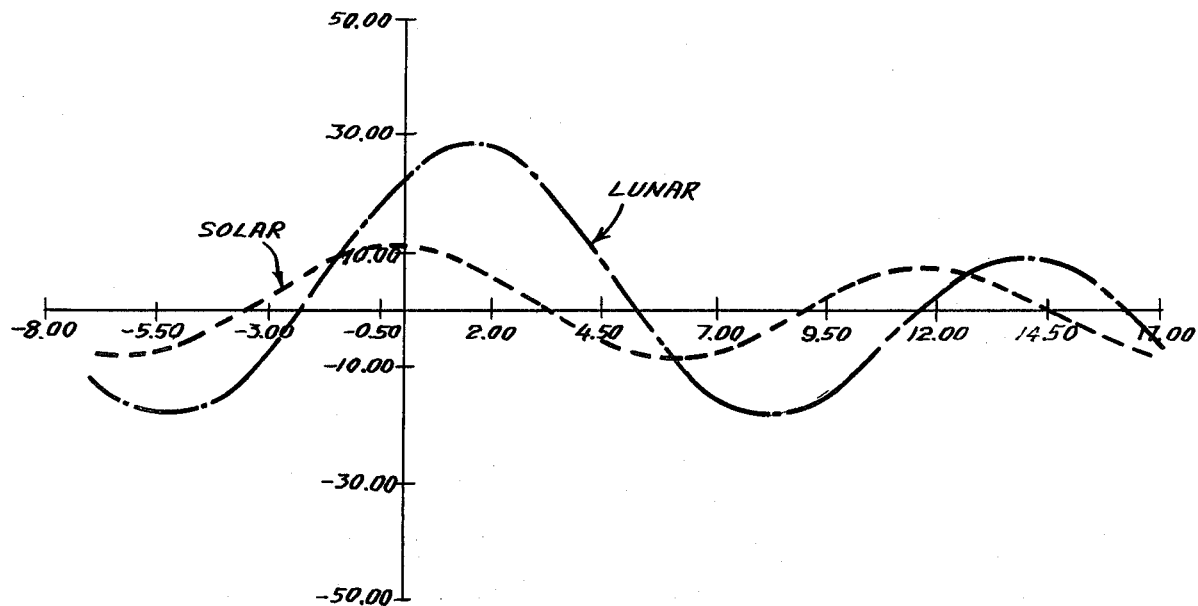
Figure 21F:
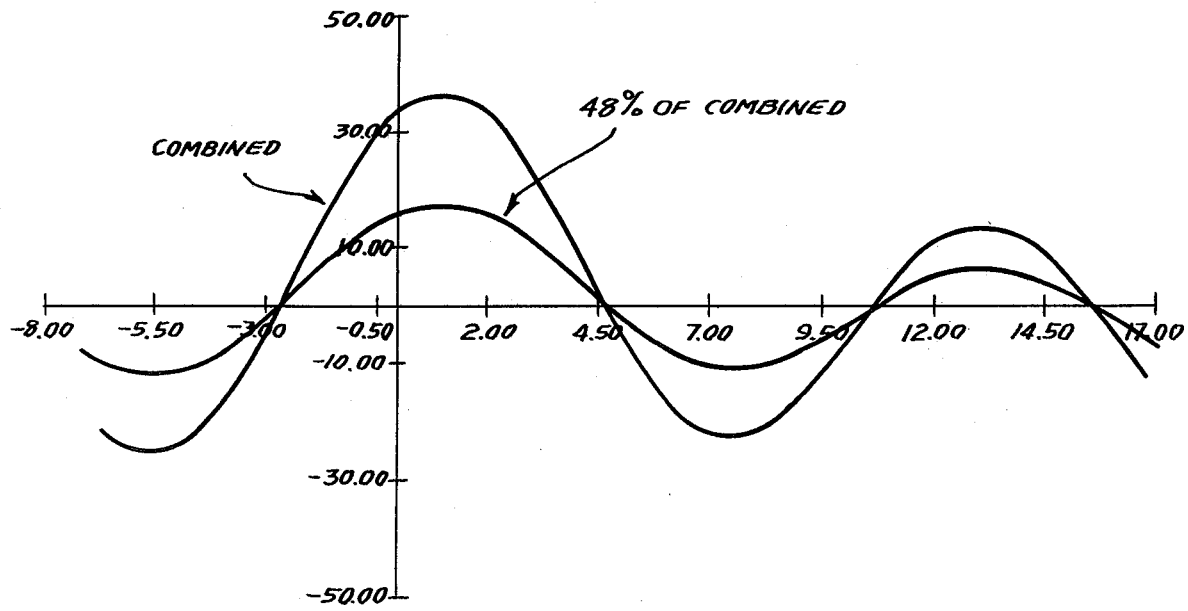

As shown in FIG. 21e, the lunar and solar components of a theoretical geoid tide are sinusoidal as is the combination thereof as is shown in FIG. 21f. Research has shown that the actual (measured) geoid tide is approximately 48 percent of the theoretical (calculated) geoid tide.

In calculating theoretical geoid tides, a number of other factors must be taken under consideration. For example, the varying inclination of the moon's orbit on the ecliptic must be accounted for, as well as its declination which also varies. Further, the variation in the distance between the earth and the sun must be considered along with the change in the earth's inclination as it travels around the sun. The abovementioned variables change evenly over a period of time and therefore may be used to advantage in resolving apparent anomalies in particular geologic regions of interest. The geoid tides may be utilized in a number of ways to locate hydrocarbon deposits but each involves recognition of the fact that the response of a particular region of the earth's crustal surface to lunar and solar gravitational pull is dependent on the specific elastic properties of the geologic structure of such crustal surface in the region of interest. Different geologic structures possess different elastic properties and therefore respond differently to the geoid tidal wave. Regions having different geologic structures will result in variations in the amplitude and phase of the tidal wave as well as in differences in the areal distribution of such amplitude and phase variations. For example, elongated geologic structures produce elongated anomalous areas in the measured geoid tide, while circularly shaped geologic structures produce similarly shaped anomalous areas in such measured tide.

The response of various types of geologic structures can be predicted by constructing theoretical models using finite element numeric analysis. By comparing the predicted (theoretical) and observed geoid tidal wave responses, the observed differences and similarities can be noted and interpreted. The presence of hydrocarbon deposits in any particular area can be inferred indirectly by noting the presence of specific geologic structures such as monoclines, anticlines, syneclines and salt-domes, which are known to be associated with hydrocarbon deposits. Moreover, since the elastic properties of a given geologic structure are dependent on the presence of pore fluids therein (e.g. hydrocarbons, water, etc.), the nature of such structure can be identified by comparing the predicted versus measured geoid tidal response and noting the differences due to variation in elasticity.

For example, the geoid tidal response of a geologic structure containing pore fluids would be different than the response of the same geologic structure without pore fluids. Finally, the elastic properties of a given geologic structure are also dependent on the kind of pore fluids present, i.e. the geoid tidal response of a given geologic structure saturated with water would be different then the response of the same geologic structure saturated with hydrocarbons; consequently, these differences provide the basis for finding hydrocarbon deposits directly by using the method for geophysical prospecting by measurement of geoid tides.

The method of measuring the direction and time of arrival of the geoid tidal wave previously discussed may be carried out in several different ways. One approach would consist of comparing the theoretical and observed amplitude and phase of the geoid tidal wave over a plurality of points spaced over the surface of a region of interest in order to "map" anomalies in the geologic structure of the region. In order to minimize measuring instrument drift due to thermal effects and ocean loading, a relative measuring system may be employed wherein a base station comprising a plurality of fixed measurement positions are set up in the region being surveyed while a plurality of movable measurement stations are shifted between various predetermined measurement positions in the region, which provide measurements of the geoid tide that may be compared to the measurements of such tide provided by the base station.

To measure the rise and fall of the crustal surface produced by lunar and solar gravitational pull, a tiltmeter constructed in accordance with the present invention is employed. FIG. 9 is a greatly simplified, partially cut away view of such a device. The tiltmeter includes first and second open-topped cups 38 and 40 which communicate with each other through a connecting tube 42. This assembly is mounted on a base 44 which in turn may be placed on the earth's crustal surface 46. The assembly of cups 30 and 40 and the connecting tube 42 are filled with a liquid 52 such as mercury. A first sensing unit 48 is located above cup 38 while second similar sensing unit 50 may be located above cup 40. The function of each sensing unit, a preferred embodiment of which will be described in more detail later, is to measure the distance from the sensing unit to the surface of the liquid 52. If the unit is initially leveled on the earth's surface, the distance $d_1$ between the sensing unit 48 and a surface of the liquid in cup 38 will be equal to the distance $d_2$ between the sensing unit 50 and the surface of the liquid in cup 40.

When the geoid tide passes the location of the unit, the entire unit will be tilted as the crustal surface of the earth rises and then falls. FIG. 10 shows, in greatly exaggerated fashion, how the unit would be tilted relative to a normal level line 54 when the crustal surface of the earth has risen beneath cup 40 to a greater extent than beneath cup 38. While the surfaces of the liquid in the cups 38 and 40 remain at the same level relative to the normal level line 54, the level of liquid in cup 40 falls relative to the upper surface of the cup and the sensing unit 50. Similarly, the level of liquid 52 in cup 58 rises relative to the sensing unit 48. Sensing unit 50 will detect a liquid-to-unit spacing of $d_2 + \Delta r$ while sensing unit 48 will detect a liquid-do-unit separation of $d_1 - \Delta r$.

Since the change in separation at one unit must be offset by an opposite, equal change at the other unit, only one sensing unit is needed to detect the rise at a given point on the earth's crustal surface. Two units would provide redundant data but may still be preferred to assure that data is still available in the event of failure of one of the sensing units. Also, since the data from the two units should correspond, any discrepancy between the outputs of the two units could be used as an indication that at least one of the units is malfunctioning or needs to be recalibrated.

FIG. 11 depicts an interferometric sensing unit for detecting changes in the level of a liquid 56 in a cup 58 relative to a mirror 60 positioned above the cup. The sensing unit includes a light source, preferably a monochromatic one such as laser 62, a beam splitter 64, a beam combining element 66, and an optical head 68 including a collimator tube 70 and a photodetector array 72.

The light beam generated by laser 62 is split at beam splitter 64 with a part being directed toward the surface of the liquid 56 and another part being directed toward the surface of the mirror 60. Light beams reflected from the surface of the liquid 56 and from the surface of the mirror 60 are recombined in the beam combining elememt 66 and applied as a single beam through the collimator tube 70 to the photodetector array 72. As the surface of the liquid 56 rises and falls, the changes in the path length from beam splitter 64 to liquid 56 to beam combining elements 66 will cause the recombined beam to display an interferometric pattern consisting of a series of alternating bright and dark bands that appear to move in one direction when the liquid surface is rising and in the opposite direction if the liquid surface is falling.

Referring to FIG. 12, photodetectors PD1, PD2 and PD3 in array 72 are used to count the number of interferometric bands, such as dark bands 74 and alternating light bands 76, which transverse the photodetectors. Signals provided by the photodetectors PD1, PD2 and PD3 also provide the formation required to determine whether the bands are moving in one direction or the other. For purposes of explaining the invention, it is arbitrarily assumed that movement of the bands from left to right indicates a falling liquid level (which corresponds to a rise in the earth's crustal surfaces) while movement of the bands from right and left indicates a rising liquid surface or a fall in the earth's crustal surface.

The photodetectors PD1, PD2 and PD3 are spaced from one another such that no more one of the photodetectors is in a dark band 74 at any given time. If an output from a photodetector in a lightband is assumed to be a binary 1, at least two out of three photodetectors and periodically all three, will produce binary 1 signals at any given time.

FIG. 13 is a block diagram of a portion of the logic circuits required to establish the magnitude and direction of changes in the elevation of the earth's crustal surface. Each of the three outputs from the photodetector array 72 is inverted by inverter amplifier 78. After inversion, no more than one of the signals will be at a binary 1 level at any given time. The inverted signals are applied in parallel to a clock reset circuit 80, to an OR gate 82 and to a two stage parallel shift register 84. Both the clock reset circuit 80 and the two stage parallel shift register 34 will be described in more detail later. The output or OR gate 82 is applied to set input terminal of a flip flop 86. The output of the clock reset circuit is applied to the reset input of this flip flop. OR gate 82 provides a setting input to the flip flop 86 whenever one of the photodetectors in array 72 is in a dark band region. Clock reset circuit 80 on the other hand provides a reset pulse only when all three photodetectors are located in one of the light bands. When flip flop 86 is set, clock circuit 88 provides a clock pulse to the shift register 84 which shifts the three binary signals stored in the first stage to the second stage while permitting the signals at the output of the inverter amplifiers 78 to be entered and stored in the first stage.

Figure 14:
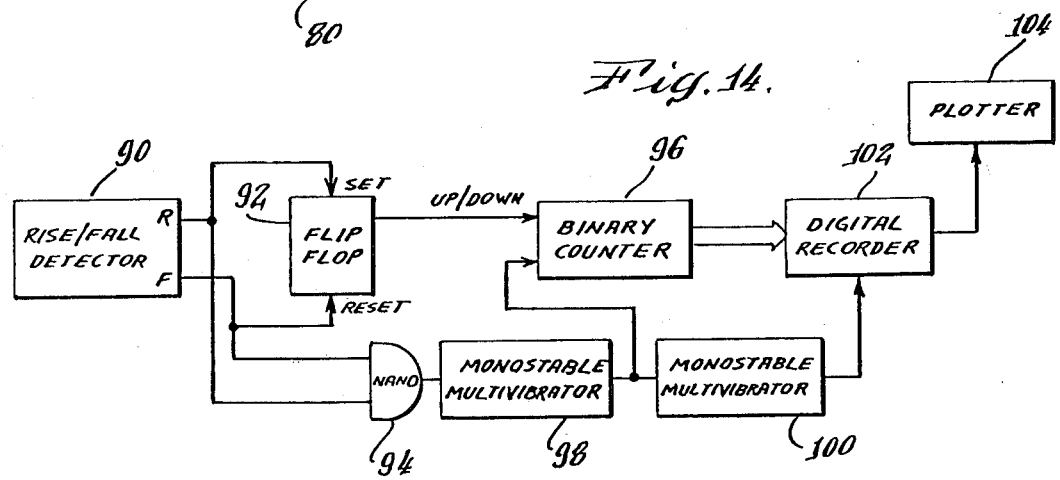
FIG. 14 is a block diagram of the remaining part of the circuit for measuring the magnitude of the earth tide at a point on the surface.

Signals from both stages of the shift resister 84 are applied to a rise/fall detector circuit 90 which decodes changes in the signal patterns to determine whether the light bands are moving to the right or to the left; that is, whether the earth's crustal surface is rising or falling. The rise/fall detector 90, which is shown again in block diagram form in FIG. 14, will be described in more detail later. A rise or R output from detector 90 is applied to a set input terminal of a flip flop 92 and one input of a NAND gate 94. A fall or F output from detector 90 is applied to the reset input terminal of flip flop 92 and to the second input of the NAND gate 94. The flip flop 92 provides a count up/count down signal to a binary counter 96 which counts pulses generated by a monostable multivibrator 98 at the output of NAND gate 94. A second monostable multivibrator 100 provides a "hand shake" signal which triggers a digital recorder 102. Digital recorder 102 records the contents of a binary counter 96. A plotter 104 is shown connected to the output of the digital recorder 102. Plotter 104 can accept data provided by digital recorder 102 and by other digital recorders in similar sensing circuits to plot the shape of the geoid tidal wve in a region of interest. Changes in the shape of the wave indicate changes in subsurface viscosity which, in turn, indicate potentially hydrocarbon-bearing formations.

Figure 15:
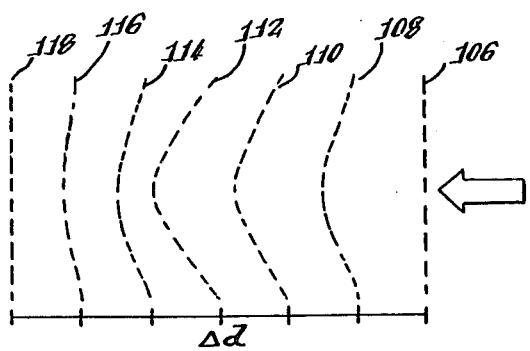
FIG. 15 is a log of tidal wave shapes in a region of interest at spaced time and distance intervals.

FIG. 15 depicts different shapes which a geoid tide wave front assumes as it trasverses a region of absormally low viscosity from left to right. The successive wave shapes are displaced from one another in both time and distance. As a matter of convenience, the successive wave shapes are discussed below with reference only to the distance displacement. Wave front 106 is basically a straight wave front such as occurs in a region of uniform viscosity. Wave form 108, which represents the geoid tide at some distance Δd to the left of the location at which wave front 106 is detected, is slightly distorted to the left indicating that the earth tide is approaching a region of abnormally low viscosity. Wave form 110 is closer to the center of region of abnormally low viscosity and correspondingly is distorted more than wave form 108. Wave form 112 is highly distorted which indicates that the geoid tide is directly above a region of abnormally low viscosity. As the tide begins to leave the low viscosity region, the amount of distortion lessens as indicated by wave shape 114 and later-occurring wave shape 116. When the geoid tide has passed beyond the region of abnormally low viscosity and into a region of uniform viscosity, the wave shape again will be a basically straight line, as indicated by the last wave shape 118 in FIG. 15.

The dynamic changes in the shapes of the wave fronts locate the region of abnormal viscosity with the most distorted wave occurring above or near the leading edge of the low viscosity region. The absolute magnitude of the distortion is not critical in determining the location of the low viscosity region. Only the relative magnitude of the distortion from one wave to the next is critical.

The magnitude of the distortion does, however, provide at least a qualitative indication of the subsurface depth of the low viscosity formation. A low viscosity formation which is relatively near the earth's surface will cause highly distorted wave shapes while a deep, low viscosity formation will result in wave shapes having relatively lesser distortion.

Figure 16:
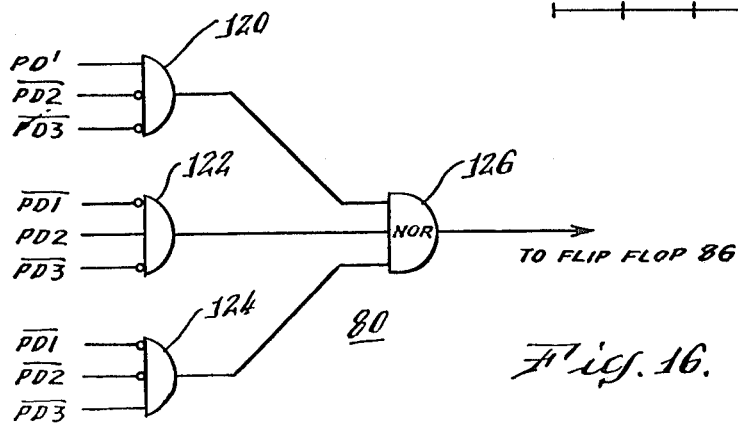
FIG. 16 is one embodiment of a clock reset circuit for the system shown in block diagram form in FIG. 13.

The components of a system suitable for generating the information required to plot the shape of geoid tide wave front over a region of interest has already been described in block diagram form. FIG. 16 is a detailed logic diagram of the clock reset circuit 80 used to reset the previously described clock-controlling the flip flop 86. The clock reset circuit includes a trio of AND gates 120, 122 and 124, each having an input from the inverter amplifier connected to each of the photodetector outputs. Each of the AND gates, 120, 122 and 124 recognizes a unique combination of photodetector outputs, going high only when that combination exists. For example, the PD2 and PD3 inputs to AND gate 120 are inverted as is conventionally indicated by the small circles interposed between the gate 120 and the leads labeled $\overline{PD2}$ and $\overline{PD3}$. Therefore, AND gate will go high only when $\overline{PD1}=0$, $\overline{PD2}=0$, and $\overline{PD3}=0$. Table 1 below indicates which of the gates is high for a particular combination of $\overline{PD1}$, $\overline{PD2}$ and $\overline{PD3}$ signals.

TABLE 1

| $\overline{PD1}$ | $\overline{PD2}$ | $\overline{PD3}$ | GATE WITH HIGH OUTPUT |
|---|---|---|---|
| 0 | 0 | 1 | Gate 124 |
| 0 | 1 | 0 | Gate 122 |
| 1 | 0 | 0 | Gate 120 |
| 0 | 0 | 0 | None |

The table indicates that at least one of the gates will have a high output for any combination of $\overline{PD1}$, $\overline{PD2}$, and $\overline{PD3}$ signals except where all of those signals are low or 0. Under the latter conditions, all of the AND gate outputs are low.

The outputs from the three AND gates 120, 122, and 124 are applied to a NOR gate 126 which goes high only when the AND gates outputs are all low; that is, only when $\overline{PD1}$, $\overline{PD2}$ and $\overline{PD3}$ are all equal to 0. The output of the NOR gate 126 is applied to the reset input terminal of the flip flop 86, causing that flip flop to be reset, preventing further generation of clock pulses by clock 88, when the inverted outputs from all of the photodetectors remain in a low level.

Figure 17:
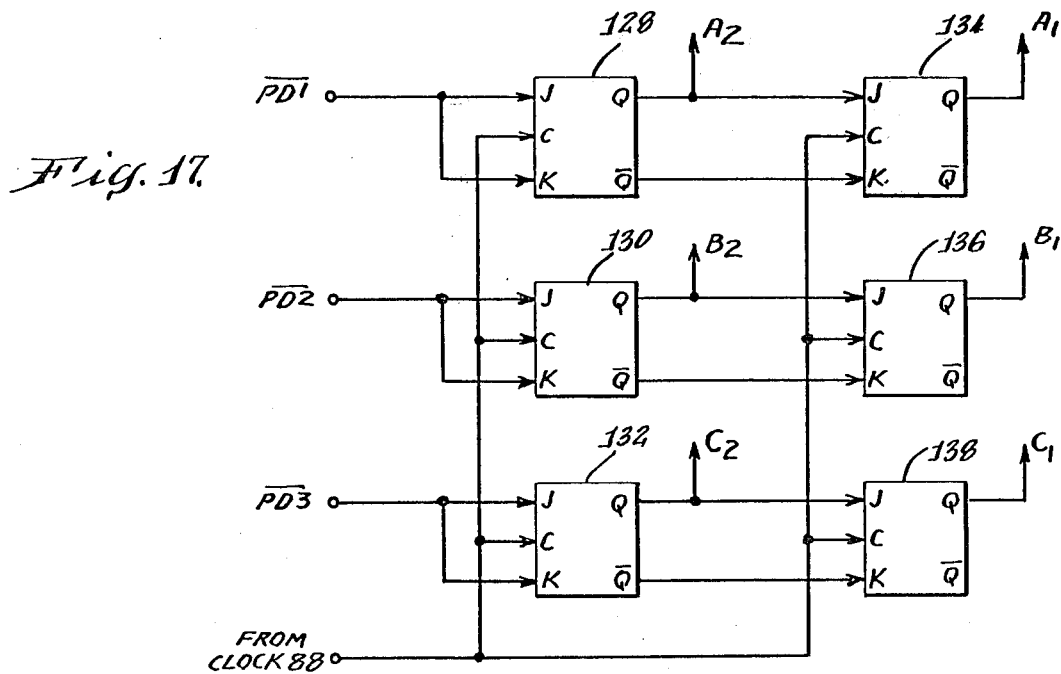
FIG. 17 is one embodiment of a two stage parallel shift register for the system shown in block diagram form in FIG. 13.

The two stage parallel shift register 84 is described in detail with reference to FIG. 17. The first stage of the shift register includes three J-K flip flops 128, 130 and 132, each having its J and K input terminals tied to the output of one of the inverter amplifiers 78. With both the J and the K inputs connected in common to the input, such a flip flop will transfer its input signal to its Q output terminal when a clock pulse is applied to the C or block input terminal.

The second stage of the shift register is the second group of three flip flops 134, 136 and 138. The J input terminal to each of the flip flops is connected directly to the Q output terminal of an associated flip flop in the first stage while the K input to the second stage flip flop is connected to the $\overline{Q}$ output of the associated first stage flip flop. With the first and second stages connected in this manner, the application of a clock pulse to a flip flop in the second stage will cause the binary signal appearing in the J input terminal of the second stage flip flop to be transferred to the Q output terminal of that flip flop. For example, a binary 1 on the J input terminal to flip flop 134 will be transferred to the A1 output terminal when the flip flop is clocked. The Q output terminals for the second stage flip flops 124, 136 and 138 carry a first set of signals $A_1$, $B_1$, $C_1$, respectively, representing the inverted outputs of the photodetectors at a particular point in time. The Q output terminals of the first stage flip flops 128, 130 and 132 carry a set of output signals $A_2$, $B_2$, $C_2$ respectively, representing the inverted photodetector outputs at a later point in time.

As the interferometric bands sweep across the photodetector array, the photodetector outputs will change in a predetermined pattern which differs depending on whether the bands are moving to the left or to the right. Assuming the bands are moving to the right, the sequence of inverted photodetector outputs is shown in Table 2.

TABLE 2

| A or $\overline{PD1}$ | B or $\overline{PD2}$ | C or $\overline{PD3}$ |
|---|---|---|
| 1 | 0 | 0 |
| 0 | 1 | 0 |
| 0 | 0 | 1 |
| 0 | 0 | 0 |
| 1 | 0 | 0 |
| 0 | 1 | 0 |
| etc. | | |

If the interferometric bands are moving from right to left, the sequence of signal patterns is reversed with the binary 1 propagating from right to left in a cycle having four possible signal states. The pattern sequence is shown below in Table 3.

TABLE 3

| A or $\overline{PD1}$ | B or $\overline{PD2}$ | C or $\overline{PD3}$ |
|---|---|---|
| 1 | 0 | 0 |
| 0 | 0 | 0 |
| 0 | 0 | 1 |
| 0 | 1 | 0 |
| 1 | 0 | 0 |
| 0 | 0 | 0 |
| etc. | | |

An inspection of Tables 2 and 3 indicates that the patterns change in a predetermined sequence. By inspecting successive patterns, it is possible to determine whether the interferometric bands are moving to the right or to the left; that is, whether the crustal surface of the earth is rising or falling.

Figure 18:
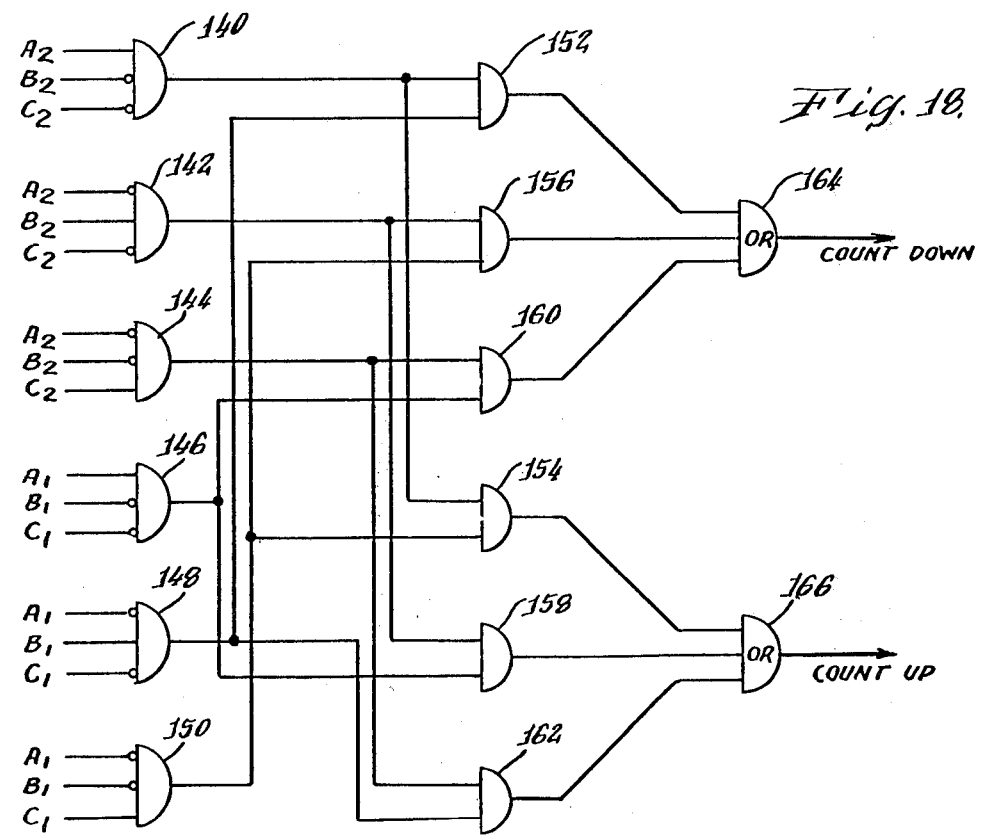
FIG. 18 is one embodiment of a rise/fall detector for use in the system shown in block diagram form in both of FIGS. 13 and 14.

A suitable rise/fall detector is illustrated in FIG. 18. The rise/fall detector includes a first set of AND gates 140, 142 and 144 having inputs from the Q output terminal of the flip flops 128, 130 and 132 in the first stage of the two stage shift register. Each of the AND gates 140, 142 and 144 will go high for one and only one combination of ones and zeros in the first stage of the two stage shift register. The rise/fall detector further includes AND gates 146, 148 and 150 which are similarly connected to the outputs of the flip flops in the second stage of the two stage shift register. Each of the AND gates in the second set also recognizes a unique combination of ones and zeros in the second stage of the shift register. The output of AND gate 140 provides an input to AND gates 152 and 154. AND gate 142 is connected to both AND gate 156 and AND gate 158 while AND gate 144 is connected to AND gates 160 and 162. The second input to each of these gates is provided by the AND gates 146, 148 and 150. For example, AND gate 146 is connected to AND gates 160 and 158.

Because of the manner in which the clock reset circuit operates, the two stage shift register does not receive any signals when all of the photodetector outputs are low. The rise/fall detector circuit 90 operates as if that particular signal pattern did not exist. Since the two inputs to each of the AND gates 152, 156, 160, 154, 158 and 162 represents inverted photodetector output at different periods of time, those AND gates can be used to determine the changes in the photodetector signal patterns. For example, AND gate 152 will go high only when the second stage of the shift register has a 010 signal pattern while the first stage of the shift register has a 100 signal pattern. Table 3 indicates that this particular sequence of signal patterns occurs when interferometric bands are moving from right to left. Simple analysis of the input signals for each of the other AND gates will indicate when the output of the gate will go high. Basically, AND gates 152, 156 and 160 go high when the interferometric bands are moving from right to left whereas AND gates 154, 158 and 162 go high when the bands are moving from left to right.

The AND gates 152, 156 and 160 provide inputs to an OR gate 164 which is connected to the set input terminal of the flip flop 92 (FIG. 4). AND gates 154, 158 and 162 provide inputs to a second OR gate 166, the output of which is connected to a reset input terminal of the flip flop 92.

While there has been described what is considered to be a preferred embodiment of the present invention, variations and modifications therein will occur to those skilled in the art once they become acquainted with the basic concepts of the invention. Therefore, it is intended that the appended claims shall be construed to include all such variations and modifications as fall within the true spirit and scope of the invention. Furthermore, while the invention has been described in connection with prospecting for hydrocarbon-bearing subsurface formations, it also has obvious use in monitoring hydraulic fracturing of oil and geothermal fields; in monitoring dilantancy near earthquake zones in order to predict earthquakes; in measuring changes in the elastic parameters of areas of the earth's crust over a period of time; in prospecting for geothermal reservoirs and deep seated magma pools; in prospecting for aquaifers; and, in performing crustal thining and stability studies in regions of interest.

What is claimed is:

1. A method of locating potentially hydrocarbon-bearing subsurface formations using tiltmeters to measure the rise and fall of the earth's surface due to the gravitational pull of extraterrestrial masses, said method comprising the steps of:
    detecting the rise and fall of the earth's surface at each of a plurality of points by means of the tiltmeters to establish the time arrival and apparent direction of a geoid tidal wave at each of the points;
    combining the time and direction measurements to establish the tidal wave shape in a region of interest, said wave shape being indicative of the viscosity in the region.

2. A method as recited in claim 1 including the step of measuring the magnitude of the rise of the earth's surface to provide an indication of the subsurface depth of a formation of interest.

3. A method as recited in claim 1 wherein the tiltmeter measurements are made along first and second axes at each of said plurality of points.

4. A method as recited in claim 3 including the step of measuring the magnitude of the rise of the earth's surface to provide an indication of the subsurface depth of a formation of having abnormal viscosity.

5. A system for locating potentially hydrocarbon-bearing subsurface formations comprising:
    tiltmeter means for detecting the rise and fall of the earth's surface at each of a plurality of points to establish the time of arrival and apparent direction of a geoid tidal wave at each of the points;
    means for combining the tiltmeter measurements to establish the shape and dynamic changes in a region of interest, the wave shape providing an indication of the subsurface viscosity in the region.

6. A system as recited in claim 5 wherein said tiltmeter means comprises an array of tiltmeters arranged in a predetermined, known pattern over a region of interest.

7. A system as recited in claim 6 wherein each of said tiltmeters also measures the magnitude of the rise in the earth's surface at each of the plurality of points to provide an indication of the subsurface depth of a formation of abnormal viscosity.

8. A system as recited in claim 5 wherein said tiltmeter means is capable of detecting the rise and fall of the earth's surface along each of two orthogonal axes at each of the plurality of points.

9. A system as recited in claim 8 wherein said tiltmeter means comprises an array of tiltmeters arranged in a predetermined known pattern over a region of interest.

10. A system as recited in claim 9 wherein each of said tiltmeters also measures the magnitude of the rise in the earth's surface at each of the plurality of points to provide an indication of the subsurface depth of a formation of abnormal viscosity.

11. A system as recited in claim 5 wherein said tiltmeter means also measures the magnitude of the rise in the earth's surface at each of the plurality of points to provide an indication of the subsurface depth of a formation of abnormal viscosity.

12. An earth survey method for locating a geologic structure in a region of interest comprising the steps of:
    measuring the phase variation and amplitude of different parts of tidal wave movements of the earth's surface at each of a plurality of points;
    combining the phase variation and amplitude to establish the wave shape in said region of interest, said wave shape being indicative of said structure.

13. The invention of claim 12, wherein the measuring step is performed by taking a first set of measurements of the magnitude of rise in the earth's surface at a plurality of fixed locations in said region of interest, and additional sets of measurements of said magnitude while moving about in said region of interest.

14. The invention of claim 12, wherein tiltmeter means are employed for performing said amplitude measuring step.

15. The invention of claim 12, wherein the amplitude measuring step is performed using tiltmeter means to establish the cross-sectional shape of the tidal wave, the symmetry of said cross-sectional shape being indicative of the compressibility of a given geologic structure in said region of interest.

* * * * *